(12) United States Patent
Isono et al.

(10) Patent No.: US 9,856,960 B2
(45) Date of Patent: Jan. 2, 2018

(54) POWER TRANSMISSION UNIT

(71) Applicants: TOYOTA JIDOSHA KABUSHIKI KAISHA, Toyota-shi, Aichi-ken (JP); ALCHEMICA CORPORATION, Susono-shi, Shizuoka (JP)

(72) Inventors: Hiroshi Isono, Susono (JP); Nobuyoshi Sugitani, Susono (JP); Aizoh Kubo, Kyoto (JP)

(73) Assignees: TOYOTA JIDOSHA KABUSHIKI KAISHA, Toyota (JP); ALCHEMICA CORPORATION, Susono-shi (JP)

( * ) Notice: Subject to any disclaimer, the term of this patent is extended or adjusted under 35 U.S.C. 154(b) by 0 days.

(21) Appl. No.: 15/378,529

(22) Filed: Dec. 14, 2016

(65) Prior Publication Data

US 2017/0167587 A1  Jun. 15, 2017

(30) Foreign Application Priority Data

Dec. 14, 2015  (JP) .................................. 2015-243311

(51) Int. Cl.
*F16H 48/10* (2012.01)
*F16H 48/34* (2012.01)

(52) U.S. Cl.
CPC ............. *F16H 48/34* (2013.01); *F16H 48/10* (2013.01); *F16H 2048/104* (2013.01); *F16H 2048/106* (2013.01); *F16H 2048/343* (2013.01)

(58) Field of Classification Search
CPC ...................................................... F16H 48/34
See application file for complete search history.

(56) References Cited

U.S. PATENT DOCUMENTS

| | | | |
|---|---|---|---|
| 5,275,248 | A | 1/1994 | Finch et al. |
| 2003/0010561 | A1 | 1/2003 | Bartel |
| 2014/0161588 | A1 | 6/2014 | Miyata et al. |
| 2016/0153537 | A1 | 6/2016 | Kubo et al. |

FOREIGN PATENT DOCUMENTS

| | | |
|---|---|---|
| JP | 2013-036375 A | 2/2013 |
| WO | 2015/008661 A1 | 1/2015 |

*Primary Examiner* — Derek D Knight
(74) *Attorney, Agent, or Firm* — Oliff PLC

(57) ABSTRACT

A power transmission unit that can multiply torque of a prime mover to be delivered to a differential gear unit is provided. Torque of a drive motor is delivered to planetary gear units through a driven gear. A first ring gear of the first planetary gear unit is meshed with a first supplemental gear, and a second ring gear of the second planetary gear unit is meshed with a second supplemental gear. The first supplemental gear and the second supplemental gear are connected to each other through a reaction gear unit to reverse the torque applied to the first ring gear to be transmitted to the second ring gear.

8 Claims, 1 Drawing Sheet

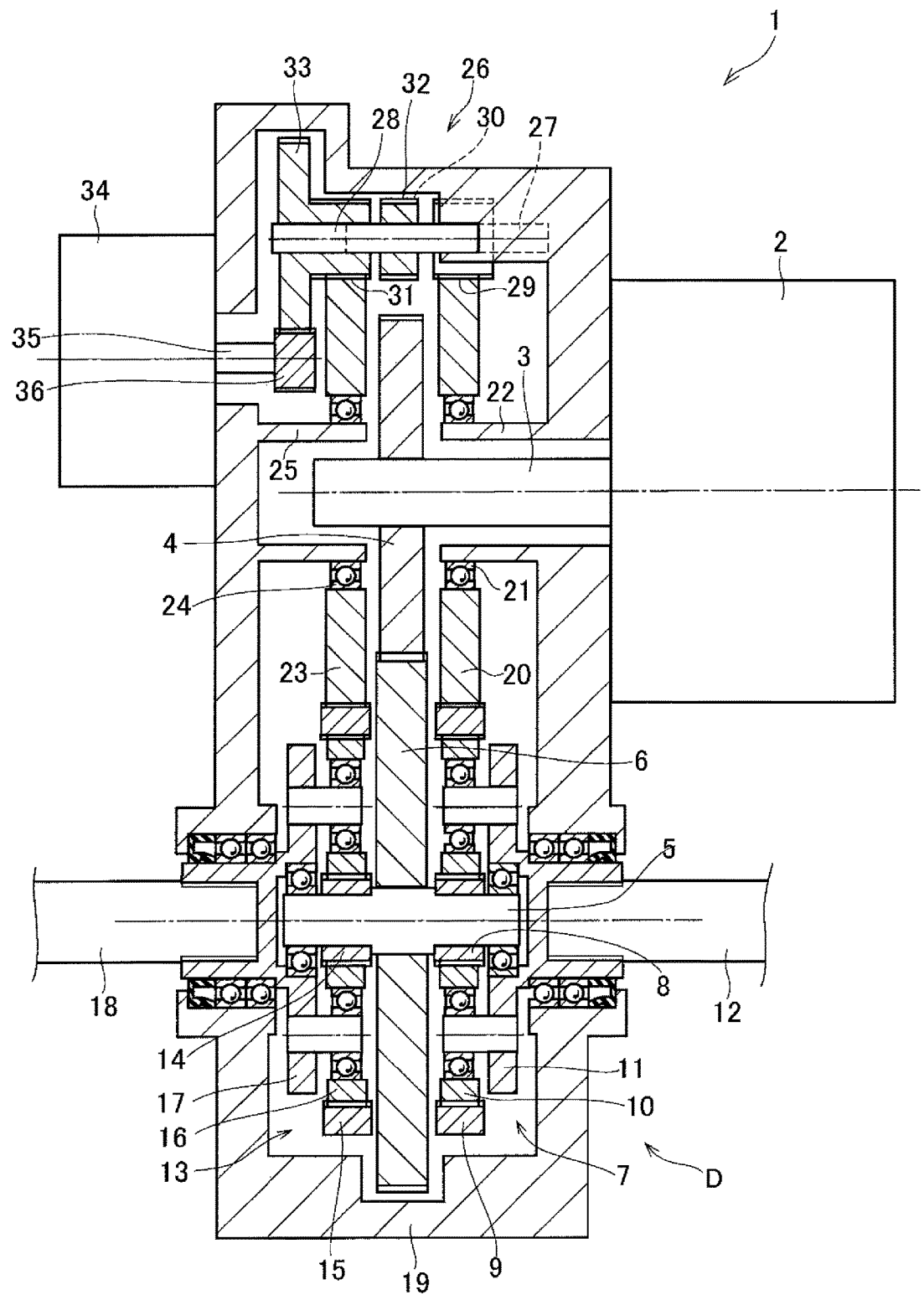

POWER TRANSMISSION UNIT

CROSS REFERENCE TO RELATED APPLICATION

The present application claims the benefit of Japanese Patent Application No. 2015-243311 filed on Dec. 14, 2015 with the Japanese Patent Office, the disclosures of which are incorporated herein by reference in its entirety.

BACKGROUND

Field of the Invention

Embodiments of the present application relate to the art of a power transmission unit for distributing torque of a drive motor to a right wheel and a left wheel while allowing relative rotation between the right wheel and the left wheel.

Discussion of the Related Art

PCT international Publication WO 2015/008661 describes a drive gear unit having a differential gear unit for distributing output torque of a drive motor to a right wheel and a left wheel, and a concentric motor for controlling a torque distribution ratio to the right wheel and the left wheel. According to the teachings of WO 2015/008661, the differential gear unit comprises two sets of pinion gear units. Sun gears of the pinion gear units are connected to both ends of a rotary shaft, and an input gear to which torque of the drive motor is applied is fitted onto an intermediate portion of the rotary shaft. Internal gears are connected to each other through a reverse rotation member having a pair of shaft members, and a reversing motor is connected to one of the internal gear. Each carrier of the pinion gear units is individually connected to the wheel through a driveshaft.

In the drive gear unit taught by WO 2015/008661, the pinion gear units are disposed on both sides of the input gear, and the internal gears are connected to each other through the reverse rotation member. However, since the reverse rotation member is arranged on an outer side of the input gear, a diameter of the input gear has to be restricted to be smaller than an outer diameter of the internal gear. For this reason, torque of the drive motor delivered to the differential gear unit may not be multiplied sufficiently.

SUMMARY

Aspects of an embodiment of the present application have been conceived noting the foregoing technical problems, and it is therefore an object of embodiment of the present application is to provide a power transmission unit that can multiply output torque of a prime mover to be delivered to a differential gear unit.

The embodiment of the present application relates to a power transmission unit comprising a prime mover and a differential mechanism. The differential mechanism includes: a first planetary gear unit having a first input element to which a torque of the prime mover is applied, a first output element connected to a first driveshaft, and a first reaction element that establishes a reaction torque to deliver the torque from the first output element to the first drive shaft; and a second planetary gear unit having a second input element to which a torque of the prime mover is applied, a second output element connected to a second driveshaft, and a second reaction element that establishes a reaction torque to deliver the torque from the second output element to the second drive shaft. In the power transmission unit, the first input element is connected to one end of a rotary shaft and the second input element is connected to the other end of the rotary shaft. An input gear is fitted onto the rotary shaft between the first input element and the second input element to be rotated by the torque of the prime mover. In order to achieve the above-mentioned objective, according to the embodiment of the present application, inner teeth and outer teeth are individually formed on ring gears serving as the first reaction element and the second reaction element. In addition, the power transmission unit is provided with: a first supplemental gear meshed with the outer teeth of the first reaction element; a second supplemental gear meshed with the outer teeth of the second reaction element; and a reaction gear unit that is meshed with the first supplemental gear and the second supplemental gear so as to reverse the torque applied to the first reaction element to be transmitted to the second reaction element.

In a non-limiting embodiment, the prime mover may include a motor. In addition, the power transmission unit may be further provided with an output gear that is fitted onto an output shaft of the motor to be meshed with the input gear.

In a non-limiting embodiment, the power transmission unit may be further provided with a differential motor that applies a torque to any one of the first supplemental gear and the second supplemental gear.

In a non-limiting embodiment, the first planetary gear unit and the second planetary gear unit may include a single-pinion planetary gear unit. In the planetary gear unit, a sun gear may serve as the input element, and a carrier may serve as the output element.

Thus, in the power transmission unit according to the embodiment, the input gear is fitted onto the rotary shaft between the first input element and the second input element to be rotated by the torque of the prime mover. The ring gears of the planetary gear units serve as the reaction elements, and inner teeth and outer teeth are individually formed on the ring gears. In addition, the supplemental gears are connected to each other through the reaction gear unit while being meshed with the outer teeth of the reaction elements. According to the embodiment, therefore, a diameter of the input gear may be increased without causing interference with the reaction gear unit. For this reason, the torques delivered to the first planetary gear unit and the second planetary gear unit may be amplified sufficiently.

In addition, in the power transmission unit according to the embodiment, the output gear is fitted onto the output shaft of the motor while being meshed with the diametrically increased input gear, and the first supplemental gear and the second supplemental gear are connected to each other through the reaction gear unit. According to the embodiment, therefore, a clearance between the output shaft of the motor and the rotary shaft can be maintained sufficiently. For this reason, a larger motor having a larger capacity may be used in the power transmission unit.

Further, according to the embodiment, the sun gear serves as the input element and the carrier serves as the output element in each of the single-pinion planetary gear unit. In the planetary gear unit thus structured, the reaction element is rotated at extremely low speed only when differentiating rotational speeds of the first driveshaft and the second driveshaft. That is, the first planetary gear unit and the second planetary gear unit may serve as a speed reducing unit to multiply the torques delivered to the first driveshaft and the second driveshaft.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 1 is a cross-sectional view of the power transmission unit according to an embodiment of the present application.

DETAILED DESCRIPTION OF THE PREFERRED EMBODIMENT(S)

Turning now to FIG. 1, there is shown a structure of the power transmission unit according to a preferred embodiment of the present application. As illustrated in FIG. 1, the power transmission unit 1 is provided with a drive motor 2 serving as a prime mover of a vehicle. For example, as a conventional hybrid vehicle and an electric vehicle, a permanent magnet synchronous motor may be used as the drive motor 2.

An output gear 4 is fitted onto an output shaft 3 of the drive motor 2. A rotary shaft 5 extends parallel to the output shaft 3 of the drive motor 2, and a driven gear 6 as an input gear is fitted onto an intermediate portion of the rotary shaft 5 to be meshed with the output gear 4. An output torque of the drive motor 2 is delivered to a differential mechanism D including planetary gear units 7 and 13 through the driven gear 6, and in order to multiply the torque of the drive motor 2, the driven gear 6 is formed to have an external diameter larger than that of the output gear 4.

A first planetary gear unit 7 as a single-pinion planetary gear unit is connected to one end of the rotary shaft 5. The first planetary gear unit 7 comprises: a first sun gear 8 as a first input element that is fitted onto one end of the rotary shaft 5; a first ring gear 9 as a first reaction element that is arranged concentrically with the first sun gear 8; a plurality of first planetary gears 10 interposed between the first sun gear 8 and the first ring gear 9 while being meshed therewith; and a first carrier 9 as a first output element that supports the first pinion gears 10 in such a manner as to rotate and revolve around the first sun gear 8. In the first planetary gear unit 7, a first driveshaft 12 is connected to the first carrier 11, and external teeth are formed on the first ring gear 9.

Likewise, a second planetary gear unit 13 as a single-pinion planetary gear unit is connected to the other end of the rotary shaft 5. The second planetary gear unit 13 comprises: a second sun gear 14 as a second input element that is fitted onto the other end of the rotary shaft 5; a second ring gear 15 as a second reaction element that is arranged concentrically with the second sun gear 14; a plurality of second planetary gears 16 interposed between the second sun gear 14 and the second ring gear 15 while being meshed therewith; and a second carrier 17 as a second output element that supports the second pinion gears 16 in such a manner as to rotate and revolve around the second sun gear 14. In the second planetary gear unit 13, a second driveshaft 18 is connected to the second carrier 17, and external teeth are also formed on the second ring gear 15.

A first supplemental gear 20 is held in a casing 19 in a rotatable manner while being meshed with the outer teeth of the first ring gear 9. Specifically, the first supplemental gear 20 is an annular member having an outer diameter larger than that of the output gear 4. A first cylinder 22 protrudes inwardly from one of lateral faces of the casing 19 in such a manner as to cover around a base portion of the output shaft 3 of the drive motor 2, and the first supplemental gear 20 is fitted onto the first cylinder 22 through a first ball bearing 21.

Likewise, a second supplemental gear 23 is also held in a casing 19 in a rotatable manner while being meshed with the outer teeth of the second ring gear 15. Specifically, the second supplemental gear 23 is also an annular member having an outer diameter larger than that of the output gear 4. A second cylinder 25 also protrudes inwardly from the other lateral face of the casing 19 in such a manner as to cover around a leading end portion of the output shaft 3 of the drive motor 2, and the second supplemental gear 23 is fitted onto the second cylinder 25 through a second ball bearing 24.

The first supplemental gear 20 and the second supplemental gear 23 are connected to each other through a reaction gear unit 26. The reaction gear unit 26 is disposed parallel to the output shaft 3 and the rotary shaft 5, and a first connecting shaft 27 and a second connecting shaft 28 of the reaction gear unit 26 are supported by the casing 19 in a rotatable manner. A first pinion gear 29 is formed on one end of the first connecting shaft 27 to be meshed with the first supplemental gear 20, and a second pinion gear 30 is formed on the other end of the first connecting shaft 27. Likewise, a third pinion gear 31 is formed on one end of the second connecting shaft 28 to be meshed with the second supplemental gear 23, and a fourth pinion gear 32 is formed on the second connecting shaft 28 at a portion to be meshed with the second pinion gear 30. Here, teeth number of the second pinion gear 30 is identical to that of the fourth pinion gear 32 so that the first connecting shaft 27 and the second connecting shaft 28 are rotated at a same speed. In the power transmission unit shown in FIG. 1, three sets of the reaction gear units 26 are arranged around the first supplemental gear 20 and the second supplemental gear 23 at predetermined intervals.

A driven gear 33 that is diametrically-larger than the pinion gears 29, 30, 31 and 32 is formed integrally with the third pinion gear 31 at the leading end of the second connecting shaft 28. In order to apply torque of a differential motor 34 to the driven gear 33, a drive gear 36 that is diametrically-smaller than the driven gear 33 is formed on an output shaft 35 of the differential motor 34. That is, the output torque of the differential motor 34 is multiplied to be delivered to the second connecting shaft 28. For example, a permanent magnet synchronous motor and an induction motor may be used as the differential motor 34, and an output torque and a rotational speed of the differential motor 34 may be controlled independently.

In the power transmission unit 1, an output torque of the drive motor 2 is delivered to the driven gear 6 through the output gear 4. As described, the external diameter of the driven gear 6 is larger than that of the output gear 4 so that the output torque of the drive motor 2 is multiplied to be delivered to the driven gear 6.

The torque delivered to the driven gear 6 is further delivered to the first sun gear 8 and the second sun gear 14. In this situation, given that the differential motor 34 does not generate torque, the torque applied to the first sun gear 8 is further delivered to the first ring gear 9 through the first pinion gears 10 while being reversed, and the torque applied to the second sun gear 14 is further delivered to the second ring gear 15 through the second pinion gears 16 while being reversed. That is, the output torque of the drive motor 2 applied to the first ring gear 9 of the first planetary gear unit 7 and to the second ring gear 15 of the second planetary gear unit 13 in the same direction. However, since the first ring gear 9 and the second ring gear 15 are connected to each other through the first supplemental gear 20, the reaction gear unit 26 and the second supplemental gear 23, torques applied to the first ring gear 9 and the second ring gear 15 counteract to each other so that the first ring gear 9 and the second ring gear 15 individually serve as a reaction element.

Consequently, the torque applied to the first sun gear 8 is delivered to the first carrier 11 while being amplified in accordance with a gear ratio of the first planetary gear unit 7, and further delivered to the first driveshaft 12 connected to one of drive wheels. Likewise, the torque applied to the second sun gear 14 is delivered to the second carrier 17 while being amplified in accordance with a gear ratio of the second planetary gear unit 13, and further delivered to the second driveshaft 18 connected to the other drive wheel. As described, since structures of the first planetary gear unit 7 and the second planetary gear unit 13 are identical to each other, same torques are delivered from the first carrier 11 and the second carrier 17 to the first drive shaft 12 and the second driveshaft 18.

In the situation that the differential motor 34 does not generate torque, the first supplemental gear 20 and the second supplemental gear 23 establish reaction forces equally against the above-explained input torque to the differential mechanism D. As described, the first supplemental gear 20 is engaged with the first pinion gear 29 and the second supplemental gear 23 is engaged with the third pinion gear 31, and the second pinion gear 30 rotated integrally with the first pinion gear 29 is engaged with the fourth pinion gear 32 rotated integrally with the third pinion gear 31. That is, the output torque of the drive motor 2 will not be applied to the differential motor 34, and hence the differential motor 34 will not be rotated as long as the vehicle travels straight.

When the differential motor 34 generates torque, a reaction torque established by the second ring gear 15 of the second planetary gear unit 13 is changed and consequently the torque of the second carrier 17 is changed. For example, an output torque of the carrier 17 is increased by generating torque by the differential motor 34 in such a manner as to increase the reaction torque of the second ring gear 15. In this case, the first ring gear 9 is subjected to the torque in a direction to weaken the reaction torque thereof, and consequently the output torque of the first carrier 11 is reduced. That is, a torque distribution ratio to the first driveshaft 12 and to the second driveshaft 18 can be altered by thus generating torque by the differential motor 34.

During turning of the vehicle, the first driveshaft 12 and the second driveshaft 18 are rotated at different speeds thereby causing a relative rotation between the first ring gear 9 and the second ring gear 15. Consequently, the differential motor 34 connected to the ring gears 9 and 15 through the supplemental gears 20 and 23 are rotated passively. In this situation, if the differential motor 34 generates torque itself, the torque of the differential motor 34 is delivered to the second supplemental gear 23 through the third pinion gear 31, and also delivered to the first supplemental gear 20 through the fourth pinion gear 32, the second pinion gear 30 and the first pinion gear 29. Specifically, the same torques are applied from the differential motor 34 to the first supplemental gear 20 and the second supplemental gear 23 in opposite directions. Consequently, the reaction torque of one of the first ring gear 9 and the second ring gear 15 is increased, and the reaction torque of the other ring gear 9 or 15 is reduced. Thus, the torque distribution ratio to the first driveshaft 12 and to the second drive shaft 18 can be altered during turning by thus generating torque by the differential motor 34. That is, torques applied to the outer wheel and to the inner wheel can be differentiated to stabilize vehicle behavior during turning by adjusting the output torque of the differential motor 34.

Here, during turning of the vehicle, the first ring gear 9 and the second ring gear 15 are rotated at extremely low speeds to adjust differential rotation between the first driveshaft 12 and the second driveshaft 18. That is, the first planetary gear unit 7 and the second planetary gear unit 13 serve as a speed reducing unit even if the first ring gear 9 and the second ring gear 15 are rotated. Specifically, during turning of the vehicle, the torque applied to the first sun gear 8 is delivered to the first driveshaft 12 from the first carrier 11 while being multiplied, and the torque applied to the second sun gear 14 is delivered to the second driveshaft 18 from the second carrier 17 while being multiplied.

Thus, in the power transmission unit according to the embodiment, the reaction gear unit 26 is connected to first ring gear 9 through the first supplemental gear 20 and to the second ring gear 15 through the second supplemental gear 23. That is, the reaction gear unit 26 may be arranged in the power transmission unit without crossing the driven gear 6. In other words, the reaction gear unit 26 may be arranged without causing interference with the driven gear 6. According to the embodiment, therefore, a diameter of the driven gear 6 may be increased without being restricted by the first ring gear 9 and the second ring gear 15. For this reason, the torques delivered to the first planetary gear unit 7 and the second planetary gear unit 13 may be amplified sufficiently. In addition, a clearance between the output shaft 3 of the drive motor 2 and the rotary shaft 5 can be maintained sufficiently. In other words, the output shaft 3 can be isolated sufficiently from the first driveshaft 12. For this reason, a larger drive motor 2 having a larger capacity may be used in the power transmission unit.

In addition, in the power transmission unit according to the embodiment, the reaction gear unit 26 is arranged higher than the output shaft 3 of the drive motor 2 that is higher than the first driveshaft 12 and the second driveshaft 18. According to the embodiment, therefore, the first driveshaft 12 and the second driveshaft 18 can be situated at a lower level in the vehicle while preventing a lower end of the power transmission unit to protrude downwardly from a vehicle body. For this reason, an inclined angle of each ball joint (not shown) attached to each leading end of the first driveshaft 12 and the second driveshaft 18 can be reduced to improve power transmission efficiency to the drive wheels.

Although the above exemplary embodiment of the present application has been described, it will be understood by those skilled in the art that the present application should not be limited to the described exemplary embodiment, and various changes and modifications can be made within the spirit and scope of the present application. For example, in the differential mechanism D, the first carrier 11 of the first planetary gear unit 7 and the second carrier 17 of the second planetary gear unit 13 may also be connected to the rotary shaft 5, and the first sun gear 8 of the first planetary gear unit 7 and the second sun gear 14 of the second planetary gear unit 13 may also be connected individually to the first driveshaft 12 and the second driveshaft 18. Alternatively, a double-pinion planetary gear unit may also be used as the first planetary gear unit 7 and the second planetary gear unit 13.

In addition, the differential motor 34 may be omitted if it is not necessary to adjust a differential rotation between the first driveshaft 12 and the second driveshaft 18. Further a number of the reaction gear unit 26 may be altered according to need.

What is claimed is:

1. A power transmission unit comprising:
   a prime mover;
   a differential mechanism including
      a first planetary gear unit having a first input element to which a torque of the prime mover is applied, a first output element connected to a first driveshaft, and a first reaction element that establishes a reaction torque to deliver the torque from the first output element to the first driveshaft, and
      a second planetary gear unit having a second input element to which the torque of the prime mover is applied, a second output element connected to a second driveshaft, and a second reaction element that establishes a reaction torque to deliver the torque from the second output element to the second driveshaft;
   a rotary shaft having a first end to which the first input element is connected and having a second end to which the second input element is connected;
   an input gear that is fitted onto the rotary shaft between the first input element and the second input element to be rotated by the torque of the prime mover;
   the first reaction element and the second reaction element including a ring gear having inner teeth and outer teeth;
   a first supplemental gear meshed with the outer teeth of the first reaction element;
   a second supplemental gear meshed with the outer teeth of the second reaction element; and
   a reaction gear unit meshed with the first supplemental gear and the second supplemental gear so as to reverse the torque applied to the first reaction element to be transmitted to the second reaction element.

2. The power transmission unit as claimed in claim 1, wherein the prime mover includes a motor, and
   further comprising an output gear that is fitted onto an output shaft of the motor to be meshed with the input gear.

3. The power transmission unit as claimed in claim 1, further comprising:
   a differential motor that applies a torque to any one of the first supplemental gear and the second supplemental gear.

4. The power transmission unit as claimed in claim 1,
   wherein the first planetary gear unit and the second planetary gear unit include a single-pinion planetary gear unit, and
   wherein a sun gear serves as the input element, and a carrier serves as the output element.

5. The power transmission unit as claimed in claim 2, further comprising:
   a differential motor that applies a torque to any one of the first supplemental gear and the second supplemental gear.

6. The power transmission unit as claimed in claim 2,
   wherein the first planetary gear unit and the second planetary gear unit include a single-pinion planetary gear unit, and
   wherein a sun gear serves as the input element, and a carrier serves as the output element.

7. The power transmission unit as claimed in claim 3,
   wherein the first planetary gear unit and the second planetary gear unit include a single-pinion planetary gear unit, and
   wherein a sun gear serves as the input element, and a carrier serves as the output element.

8. The power transmission unit as claimed in claim 5,
   wherein the first planetary gear unit and the second planetary gear unit include a single-pinion planetary gear unit, and
   wherein a sun gear serves as the input element, and a carrier serves as the output element.

* * * * *